US012424356B2

(12) United States Patent
Tokiwa et al.

(10) Patent No.: US 12,424,356 B2
(45) Date of Patent: Sep. 23, 2025

(54) RESISTOR

(71) Applicant: KOA Corporation, Nagano (JP)

(72) Inventors: Yohei Tokiwa, Nagano (JP); Kohji Eto, Nagano (JP); Tomofumi Noguchi, Nagano (JP); Reina Kaneko, Nagano (JP)

(73) Assignee: KOA Corporation, Nagano (JP)

( * ) Notice: Subject to any disclaimer, the term of this patent is extended or adjusted under 35 U.S.C. 154(b) by 346 days.

(21) Appl. No.: 17/759,510

(22) PCT Filed: Dec. 28, 2020

(86) PCT No.: PCT/JP2020/049194
§ 371 (c)(1),
(2) Date: Jul. 26, 2022

(87) PCT Pub. No.: WO2021/153151
PCT Pub. Date: Aug. 5, 2021

(65) Prior Publication Data

US 2023/0040566 A1 Feb. 9, 2023

(30) Foreign Application Priority Data

Jan. 27, 2020 (JP) ................................ 2020-011194

(51) Int. Cl.
*H01C 1/14* (2006.01)

(52) U.S. Cl.
CPC ..................................... *H01C 1/14* (2013.01)

(58) Field of Classification Search
CPC ........................................................ H01C 1/14
See application file for complete search history.

(56) References Cited

U.S. PATENT DOCUMENTS

| | | | | |
|---|---|---|---|---|
| 9,076,576 | B2 * | 7/2015 | Saito | H01C 7/008 |
| 9,437,353 | B2 * | 9/2016 | Hetzler | H01C 7/13 |
| 9,911,524 | B2 * | 3/2018 | Tanaka | H01C 17/242 |
| 9,934,893 | B2 * | 4/2018 | Murakami | H01C 17/22 |
| 9,972,424 | B2 * | 5/2018 | Hetzler | H01C 17/00 |
| 9,984,798 | B2 | 5/2018 | Amemiya et al. | |

(Continued)

FOREIGN PATENT DOCUMENTS

| | | | |
|---|---|---|---|
| DE | 202013009973 | U1 | 11/2013 |
| DE | 112012003086 | T5 | 6/2014 |

(Continued)

OTHER PUBLICATIONS

WO-2015001781, machine translation (Year: 2015).*

(Continued)

*Primary Examiner* — Kyung S Lee
(74) *Attorney, Agent, or Firm* — Honigman LLP

(57) ABSTRACT

A resistor contains a resistance body and a pair of electrodes (a first electrode body and a second electrode body), wherein end surfaces of the resistance body are respectively abutted to and bonded to end surfaces of the electrodes (a first electrode body and a second electrode body), the electrodes (a first electrode body and a second electrode body) each includes a main body portion and a leg portion, the leg portion protruding from the main body portion in the mounting surface of the resister, and a length dimension of the resistor is equal to or shorter than 3.2 mm.

7 Claims, 15 Drawing Sheets

(56) References Cited

U.S. PATENT DOCUMENTS

| | | | | |
|---|---|---|---|---|
| 10,957,472 | B2 * | 3/2021 | Kobayakawa | G01R 1/203 |
| 2004/0252009 | A1 * | 12/2004 | Tsukada | H01C 17/006 338/203 |
| 2013/0222106 | A1 | 8/2013 | Saito et al. | |
| 2014/0125429 | A1 | 5/2014 | Yoshioka et al. | |
| 2017/0243679 | A1 * | 8/2017 | Hetzler | G01R 15/146 |
| 2019/0227104 | A1 * | 7/2019 | Nakamura | H01C 1/14 |

FOREIGN PATENT DOCUMENTS

| | | | | | |
|---|---|---|---|---|---|
| DE | 112014004358 | T5 | | 6/2016 | |
| JP | 2001-332409 | A | | 11/2001 | |
| JP | 2002-057009 | A | | 2/2002 | |
| JP | 2015-65197 | A | | 4/2015 | |
| JP | 2019-36571 | A | | 3/2019 | |
| WO | WO2013076817 | | * | 5/2013 | |
| WO | WO-2015001781 | A1 | * | 1/2015 | G01R 1/203 |
| WO | WO-2016062369 | A1 | * | 4/2016 | G01R 1/203 |

OTHER PUBLICATIONS

WO-2016062369, machine translation (Year: 2016).*

International Search Report, Application No. PCT/JP2020/049194, mailed Mar. 2, 2021.

* cited by examiner

RESISTOR

CROSS-REFERENCE TO RELATED APPLICATIONS

This application is the U.S. national stage of PCT/JP2020/049194 filed on Dec. 28, 2020, which claims priority of Japanese Patent Application No. JP 2020-011194 filed on Jan. 27, 2020, the contents of which are incorporated herein.

TECHNICAL FIELD

The present disclosure relates to a resistor.

BACKGROUND ART

JP2002-57009A discloses, as a small-sized current sensing resistor that is suitable for measurement of a large current, a resistor in which a pair of electrodes are bonded on a lower surface of a resistance body.

SUMMARY OF DISCLOSURE

Incidentally, with the electrification and automated driving of automobiles, resistors as on-board parts are required to have both smaller size and lower resistance. However, with the resistor of a type as disclosed in JP2002-57009A, because the dimension of the resistance body is the same as the dimension of the resistor and a resistance value also depends largely on the dimension of the resistor, it is difficult to further reduce the resistance so as to become lower than the resistance value that is expected from the dimension of the resistor.

Thus, an object of the present disclosure is to provide a resistor capable of achieving lower resistance, which cannot be achieved by general resistors, while achieving size reduction.

According to one aspect of the present disclosure, provided is a resistor provided with a resistance body and a pair of electrodes connected to the resistance body, wherein end surfaces of the resistance body are respectively abutted to and bonded to end surfaces of the electrodes, the electrodes each includes a main body portion and a leg portion, the leg portion protruding from the main body portion in the mounting surface of the resister, and a length dimension of the resistor is equal to or shorter than 3.2 mm.

DETAILED DESCRIPTION OF PREFERRED EMBODIMENTS

Explanation of Resistor

First Embodiment

Figure 1:
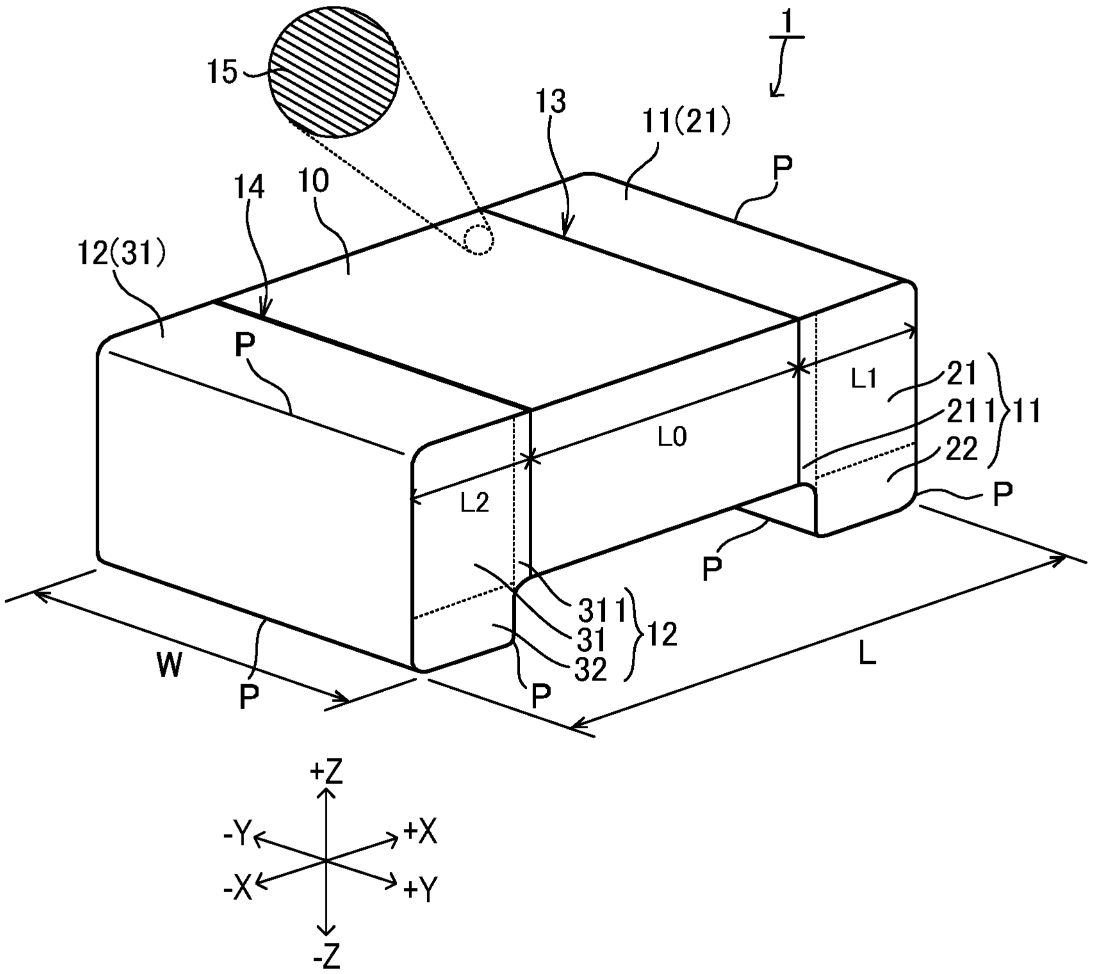
FIG. 1 is a perspective view of a resistor according to a first embodiment.
Figure 2:
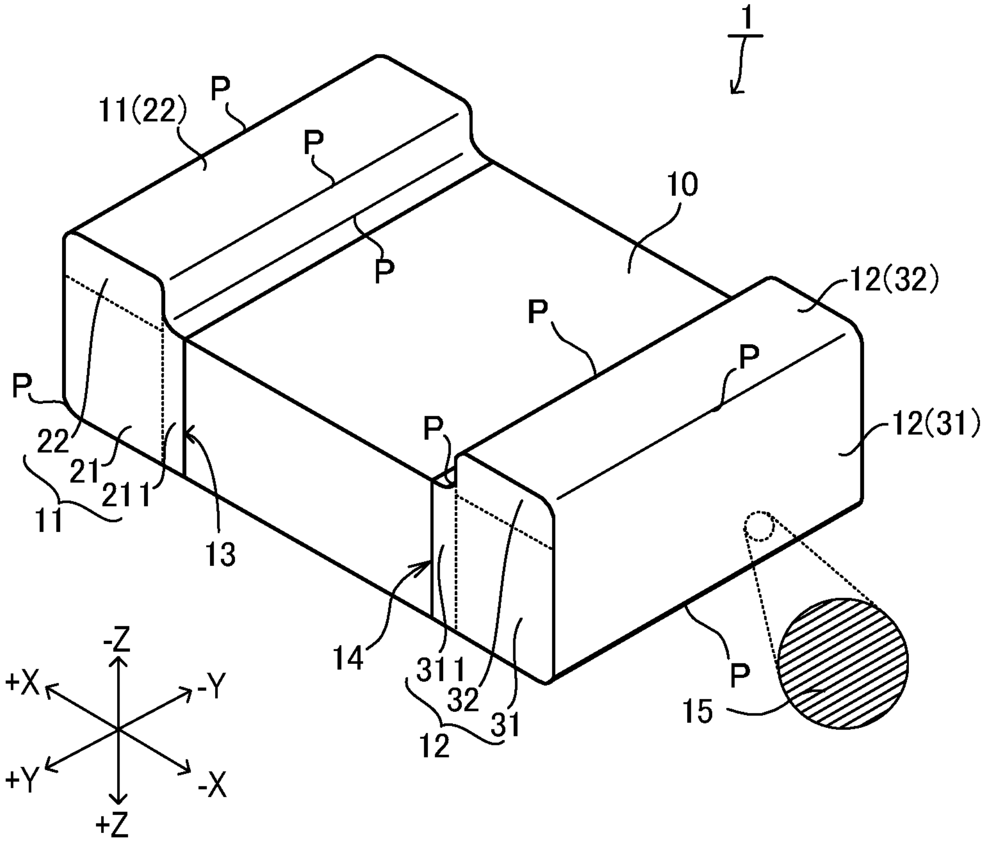
FIG. 2 is a perspective view of the resistor according to the first embodiment viewed from the side of a mounting surface for a circuit board.

A resistor 1 of a first embodiment according to the present disclosure will be described in detail with reference to FIGS. 1 and 2. FIG. 1 is a perspective view of the resistor 1 according to the first embodiment. FIG. 2 is a perspective view of the resistor 1 according to the first embodiment viewed from the side of a mounting surface for a circuit board.

The resistor 1 is provided with a resistance body 10, a first electrode body 11 (an electrode), and a second electrode body 12 (the electrode), and the resistor 1 is formed by bonding the first electrode body 11, the resistance body 10, and the second electrode body 12 in this order. The resistor 1 is mounted on the circuit board, etc., which is not shown in FIG. 1. For example, the resistor 1 is arranged on a pair of electrodes that are formed on a land pattern of the circuit board. In this embodiment, the resistor 1 is used as a current sensing resistor (a shunt resistor).

In this embodiment, the direction in which the first electrode body 11 and the second electrode body 12 are arranged (the longitudinal direction of the resistor 1) is referred to as the X direction (the direction towards the first electrode body 11 is referred to as the +X direction, and the direction towards the second electrode body 12 is referred to as the −X direction), the width direction of the resistor 1 is referred to as the Y direction (the front side with respect to the plane of FIG. 1 is referred to as the +Y direction, and the back side with respect to the plane of FIG. 1 is referred to as the −Y direction), and the thickness direction of the resistor 1 is referred to as the Z direction (the direction towards the circuit board is referred to as the −Z direction, and the direction away from the circuit board is referred to as the +Z direction). The X direction, the Y direction, and the Z direction are orthogonal with each other. In addition, the mounting surface of the resistor 1 means a surface of the resistor 1 that opposes to the circuit board when the resistor 1 is mounted on the circuit board, and the mounting surface includes respective surfaces of the first electrode body 11, the resistance body 10, and the second electrode body 12 that oppose to the circuit board.

In this embodiment, the resistance body 10 is formed to have a cuboid shape (or a cube shape).

In this embodiment, from the view point of sensing a large current at a high accuracy, it is preferable that the resistance body 10 be formed of a resistance body material having a low specific resistance and a small temperature coefficient of resistance (TCR). As examples, a copper-manganese-nickel alloy, a copper-manganese-tin alloy, a nickel-chromium alloy, a copper-nickel alloy, and so forth can be used.

The first electrode body 11 is provided with a main body portion 21 that is bonded to the resistance body 10 and a leg portion 22 that is formed integrally with the main body portion 21 so as to extend towards the circuit board. In addition, the second electrode body 12 is provided with a main body portion 31 that is bonded to the resistance body 10 and a leg portion 32 that is formed integrally with the main body portion 31 so as to extend towards the circuit board.

The first electrode body 11 (the main body portion 21 and the leg portion 22) and the second electrode body 12 (the main body portion 31 and the leg portion 32) are preferably be formed of an electrically conductive material having a good electrical conductivity and thermal conductivity from the view point of ensuring a stable sensing accuracy. As one example, copper, a copper alloy, and so forth may be used as the first electrode body 11 and the second electrode body 12. An oxygen-free copper (C1020) may preferably be used as the copper. The same material can be used for the first electrode body 11 and the second electrode body 12.

The main body portion 21 of the first electrode body 11 has an end surface having substantially the same shape as an end surface of the resistance body 10 on the +X direction side, and the end surface of the main body portion 21 is bonded to the end surface of the resistance body 10 on the +X direction side so as to be abutted thereto. At a bonded portion 13 between the main body portion 21 and the resistance body 10, a boundary between the resistance body 10 and the main body portion 21 has no step and is flat, and so, the resistance body 10 and the main body portion 21 form a smooth continuous surface. In other words, a surface of the bonded portion 13 is formed so as to be flat over the entire circumference of the boundary between the resistance body 10 and the main body portion 21 (the state in which the step is not formed).

The main body portion 31 of the second electrode body 12 has an end surface having substantially the same shape as an end surface of the resistance body 10 on the −X direction side, and the end surface of the main body portion 31 is bonded to the end surface of the resistance body 10 on the −X direction side so as to be abutted thereto. At a bonded portion 14 between the main body portion 31 and the resistance body 10, the boundary of the resistance body 10 and the main body portion 31 has no step and is flat, and so, the resistance body 10 and the main body portion 31 form a smooth continuous surface. In other words, a surface of the bonded portion 14 is formed so as to be flat over the entire circumference of the boundary between the resistance body 10 and the main body portion 31 (the state in which the step is not formed).

The leg portion 22 is a member that extends towards the −Z direction from the mounting surface of the resistor 1, in other words, from a surface of the main body portion 21 opposing to the circuit board. Although the length of the leg portion 22 in the X direction is shorter than that of the main body portion 21, a side surface of the leg portion 22 on the +X direction side forms the same flat surface with a side surface of the main body portion 21 on the +X direction side.

The leg portion 32 is a member that extends towards the −Z direction from the mounting surface of the resistor 1, in other words, from a surface of the main body portion 31 opposing to the circuit board. Although the length of the leg portion 32 in the X direction is shorter than that of the main body portion 31, a side surface of the leg portion 32 on the −X direction side forms the same flat surface with a side surface of the main body portion 31 on the −X direction side.

In this embodiment, a bonded surface at the bonded portion 13 between the resistance body 10 and the first electrode body 11 and a bonded surface at the bonded portion 14 between the resistance body 10 and the second electrode body 12 are each bonded by a cladding (a solid phase bonding). In other words, the bonded surfaces respectively form a diffusion bonded surface in which metal atoms in the resistance body 10 and the first electrode body 11 are mutually diffused and the diffusion bonded surface in which metal atoms in the resistance body 10 and the second electrode body 12 are mutually diffused.

The resistor 1 is mounted on the circuit board such that the leg portion 22 and the leg portion 32 project out towards the circuit board, and thereby, the resistance body 10 is mounted on the circuit board so as to be floating over the circuit board.

The main body portion 21 includes a protruded portion 211 that is protruded towards the −X direction side so as to be longer than the length of the leg portion 22 in the X direction, and the protruded portion 211 is bonded to the resistance body 10. Similarly, the main body portion 31 includes a protruded portion 311 that is protruded towards the +X direction side so as to be longer than the length of the leg portion 32 in the X direction, and the protruded portion 311 is bonded to the resistance body 10.

When the length (L, see FIG. 1) of the resistor 1 in the longitudinal direction (the X direction) is set constant, by arbitrarily adjusting the length of the protruded portion 211 in the X direction (the length L1 of the main body portion 21, see FIG. 1) or the length of the protruded portion 311 in the X direction (the length L2 of the main body portion 31 in the X direction, see FIG. 1), it is possible to adjust the length of the resistance body 10 in the X direction (L0, see FIG. 1) so as to satisfy L0=L−(L1+L2). Therefore, it is possible to arbitrarily adjust the resistance value of the resistor 1 without changing the dimension (L) of the resistor 1 and without changing the shapes of the leg portions 22 and 32. Alternatively, even if the protruded amount of each the protruded portions 211 and 311 is increased without changing the dimension (L) of the resistor 1, the distance between the leg portion 22 and the leg portion 32 can be ensured, and so, it is possible to increase the degree of freedom for designing the resistor 1 while ensuring the distance between the land patterns.

In the above, the ratio of the length L0 of the resistance body 10 in the longitudinal direction of the resistance body 10 (the X direction), the length L1 of the first electrode body 11 in the X direction, and the length L2 of the second electrode body 12 in the X direction can be set arbitrarily. However, from the view point of reducing the resistance value while suppressing the increase in the TCR (the temperature coefficient of resistance [ppm/° C.]), it is preferable that the ratio be set so as to be L1:L0:L2=1:2:1 or about 1:2:1.

Furthermore, from the view point of increasing a heat radiation property and reducing the resistance value, it is preferable that the ratio of the length L0 of the resistance body 10 relative to the length L of the resistor 1 (=L1+L0+L2) be equal to or less than 50%.

In this embodiment, the resistor 1 has, on its surface, stripe-patterned grooves and ridges 15 (see an enlarged view in FIG. 1 and an enlarged view in FIG. 2). In this embodiment, the stripe-patterned grooves and ridges 15 are formed so as to extend along the Y direction on other side surfaces than the side surface facing the +Y direction and the side surface facing the −Y direction of the resistor 1.

The surface roughness caused by the groove portions and the ridge portions of the stripe-patterned grooves and ridges 15 can be about from 0.2 to 0.3 μm in terms of arithmetic average roughness (Ra).

In this embodiment, from the view point of applying the resistor 1 to the high density circuit board, the length L of the resistor 1 in the X direction can be set equal to or shorter than 3.2 mm, and the length W of the resistor 1 in the Y direction (the width) can be set equal to or shorter than 1.6 mm (product standard 3216 size). Thus, as the size of the resistor 1 in this embodiment, the resistor 1 can also be applied to product standard 2012 size (L: 2.0 mm, W: 1.2 mm), product standard 1608 size (L: 1.6 mm, W: 0.8 mm), and product standard 1005 size (L: 1.0 mm, W: 0.5 mm). From the view point of achieving a handling property in a manufacturing method, which will be described below, for example, from the view point of preventing failure of a resistor base material 100 forming a base of the resistor 1 (see FIG. 15), the length L of the resistor 1 in this embodiment can be set to have the size equal to or larger than the above-described product standard 1005 size.

In this embodiment, from the view point of realizing the small size and the low resistance, it is possible to adjust the resistance value of the resistor 1 so as to be equal to or lower than 2 mΩ in any of the above-described sizes, and for example, it is possible to adjust the resistance value so as to be equal to or lower than 0.5 mΩ. In the above, the low resistance is a concept including the resistance value that is lower than the resistance value assumed from the dimension of a general resistor (for example, the resistor of the type disclosed in JP2002-57009A described above).

In this embodiment, all of corner portions P each serving as an edge side extending in the Y direction of the resistor 1 have chamfered shapes. In this embodiment, it is preferred that a radius of curvature of each corner portion P be set so as to be R=0.1 mm or less.

Effects of First Embodiment

According to the resistor 1 in the first embodiment, the resistor 1 is provided with the resistance body 10 and the pair of electrodes (the first electrode body 11 and the second electrode body 12) connected to the resistance body 10, wherein the end surfaces of the resistance body 10 are respectively abutted to and bonded to the end surfaces of the electrodes (the first electrode body 11 and the second electrode body 12), the electrodes (the first electrode body 11 and the second electrode body 12) respectively include the main body portions 21 and 31 and the leg portions 22 and 32, the leg portions 22 and 32 respectively protruding from the main body portions 21 and 31 towards the mounting surface, and the length of a long side of the resistor 1 is equal to or shorter than 3.2 mm.

With the above-described configuration, the leg portions 22 and 32 that respectively protrude from the main body portions 21 and 31 towards the mounting surface are configured by the resistance body 10 and the pair of electrodes (the first electrode body 11 and the second electrode body 12) connected to the resistance body 10. With such a configuration, because lines can be drawn out from sensing terminals between the leg portions 22 and 32, it is possible to achieve the resistor 1 having the small size. In addition, because the electrodes (the first electrode body 11 and the second electrode body 12) are bonded on both ends of the resistance body 10, the dimension of the resistance body 10 (in the X direction) becomes smaller than the dimension of the resistor 1 (in the X direction). With such a configuration, it is possible to achieve the resistor 1 having a lower resistance than resistors of the type in which the pair of electrodes are bonded to the lower surface of the resistance body 10. As described above, it is possible to obtain the resistor 1 capable of realizing further lower resistance (2 mΩ or lower), which has not been achieved with general resistors, while realizing the smaller size (the long side dimension 3.2 mm or shorter, 3216 size or smaller).

In a case of a resistor that is formed by welding the resistance body and the electrode bodies by using, for example, electron beam, it is required to consider influence on the resistance value caused by the beads formed by the welding in a case of the resistor of this size scale. However, with the resistor 1 according to this embodiment, as described below, because the resistance body 10 can be bonded to the first electrode body 11, and the resistance body 10 can be bonded to the second electrode body 12 by the diffusion bonding, it is possible to stabilize properties such as the resistance value, etc. even if the resistor is designed to have such a small size.

In this embodiment, in the mounting surface of the resistor 1, the boundary portions (the bonded portions 13 and 14) between the resistance body 10 and the respective main body portions 21 and 31 are flat. Because the welding beads caused by the electron beam welding, etc. are not formed, the boundaries between the resistance body 10 and the respective main body portions 21 and 31 become obvious, and so, it is possible to perform a judgement as being acceptable or defective with ease. In addition, when the resistor 1 is used as a shunt resistor, it is possible to suppress deterioration of the sensing accuracy of the current generated due to formation of the step at the boundaries between the resistance body 10 and the respective main body portions 21 and 31 (the bonded portions 13 and 14). Furthermore, it is possible to improve a stability of the resistance value and a thermal property.

In this embodiment, the resistance body 10 is bonded to the main body portions 21 and 31 by the solid phase bonding. Thus, the resistance body 10 and the first electrode body 11 are firmly bonded with each other, and the resistance body 10 and the second electrode body 12 are firmly bonded with each other, and therefore, a good electrical property can be obtained. In addition, in the resistor 1, the electron beam welding, for example, is not used for the bonding between the resistance body 10 and the first electrode body 11 and the bonding between the resistance body 10 and the second electrode body 12, and therefore, the bonded portions 13 and 14 do not have the welding beads (a welding mark having an irregular shape). Therefore, a bondability is not deteriorated even in a case in which wire bonding, etc. is performed on the surface of the resistor 1.

In this embodiment, the main body portions 21 and 31 respectively have the protruded portions 211 and 311 that are protruded towards the resistance body side so as to be longer than the lengths of the leg portions 22 and 32 (the X direction). With such a configuration, when the length L of the resistor 1 in the longitudinal direction (the X direction) is set constant, by arbitrarily adjusting the length L1 of the protruded portion 211 in the X direction (the length of the main body portion 21 in the X direction) or the length L2 of the protruded portion 311 in the X direction (the length of the main body portion 31 in the X direction), it is possible to adjust the length L0 of the resistance body 10 in the X direction so as to satisfy L0=L−(L1+L2). Therefore, it is possible to arbitrarily adjust the resistance value of the resistor 1 without changing the shapes of the leg portions 22 and 32.

In this embodiment, in the direction in which the resistance body 10 and the electrodes (the first electrode body 11 and the second electrode body 12) of the resistor 1 are arranged (the X direction), end portions of the leg portions 22 and 32 on the mounting surface side each has the chamfered shape.

In general resistors, the resistors tend to be damaged due to occurrence of a phenomenon called an electromigration that is caused as a current density is increased in a non-chamfered corner portion, or due to concentration of thermal stress to such a corner portion in a similar manner. In addition, because the electromigration has a non-negligible influence as the circuit size is decreased, there was a concern that the smaller the resistor is, the more pronounced the electromigration becomes.

In contrast, in the resistor 1, because the corner portions P are chamfered, deviation of the current density in the corner portions P is reduced. Thus, it is possible to suppress occurrence of the electromigration. In addition, in a similar manner, because the concentration of the thermal stress can be reduced, it is possible to improve a heat cycle resistance.

In the present embodiment, the direction orthogonal to the direction in which the resistance body 10 and the electrodes (the first electrode body 11 and the second electrode body 12) of the resistor 1 are arranged (the X direction) as well as to the mounting direction of the resistor 1 (the Z direction) is set as the width direction (the Y direction), and the surface of the resistance body 10 and/or the surfaces of the electrodes (the first electrode body 11 and the second electrode body 12) is/are formed with the stripe-patterned grooved and ridged surface (the stripe-patterned grooves and ridges 15) extending in the width direction (the Y direction). With such a configuration, the surface area of the resistor 1 can be increased to improve the heat radiation property, and in addition, when the grooves and ridges are formed on the electrodes (the first electrode body 11 and the second electrode body 12), it is possible to increase a bonding strength for a solder for fixing the resistor 1 to the circuit board.

In the present embodiment, the resistance body 10 is formed to have the cuboid shape (or the cube shape). In a case in which the resistance body 10 has the cuboid shape (or the cube shape), the first electrode body 11 and the second electrode body 12 are respectively formed to have substantially the same shapes as the end surfaces of the resistance body 10 and are respectively bonded to the end surfaces of the resistance body 10, and a path of the current flowing from the first electrode body 11 and the second electrode body 12 through the resistance body 10 is formed linearly, and therefore, it is possible to stabilize the resistance value. In addition, in the resistor 1, because the resistance body 10 is bonded between the first electrode body 11 and the second electrode body 12, it is possible to adjust the resistance value while setting the volume of the resistance body 10 to the minimum required volume.

Second Embodiment

Figure 3:
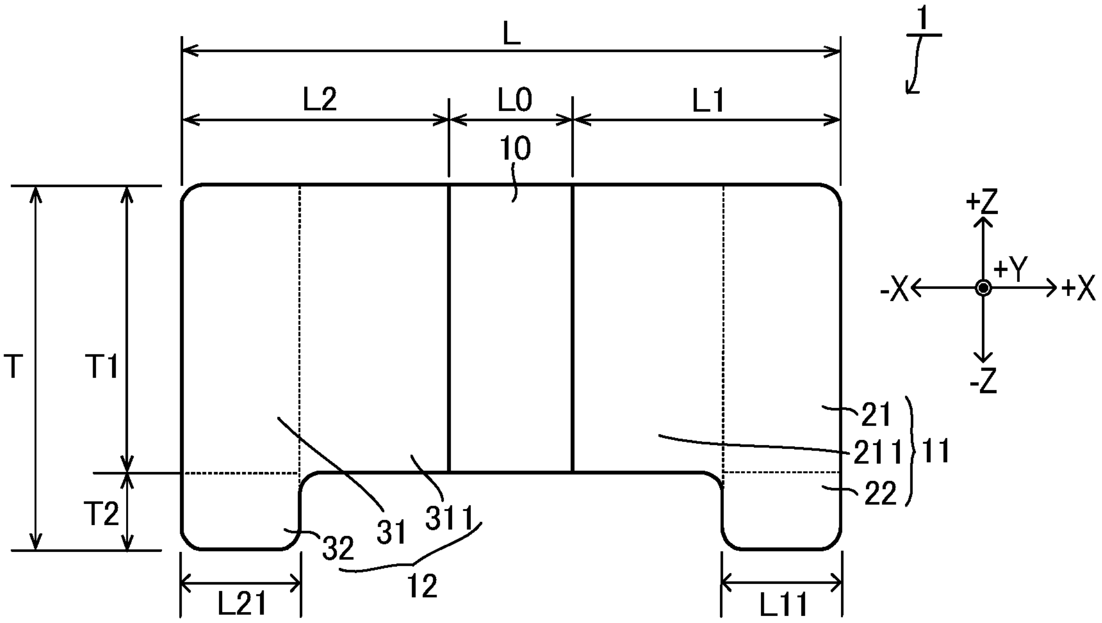
FIG. 3 is a side view of the resistor in a second embodiment.

FIG. 3 is a side view of the resistor 1 of a second embodiment. In the embodiments and modifications described below, components that are common with those in the first embodiment are assigned the same numbers, and a description thereof will be omitted if not necessary.

In the resistor 1 in the second embodiment, when the length L in the longitudinal direction (the X direction) is set constant for example, the ratio (L0/L1) between the length L0 of the resistance body 10 and the length L1 of the first electrode body 11 in the longitudinal direction (the X direction) is smaller than the ratio (L0/L1) for the resistor 1 in the first embodiment. In addition, the ratio (L0/L2) between the length L0 of the resistance body 10 and the length L2 of the second electrode body 12 is smaller than the ratio (L0/L2) for the resistor 1 in the first embodiment. In this embodiment, the resistor 1 is configured such that L0 becomes smaller than L1 and L2.

In addition, by referring the length of the resistor 1 in the Z direction as T (for example, constant), a ratio (T2/T1) between the length T1 of the resistance body 10, the main body portion 21, and the main body portion 31 and the length T2 of the leg portion 22 and the leg portion 32 is smaller than the corresponding ratio for the resistor 1 in the first embodiment. Furthermore, the length L11 of the leg portion 22 in the X direction is shorter than the length of the leg portion 22 of the resistor 1 in the first embodiment, and the length L21 of the leg portion 32 in the X direction is also formed to be shorter than the length of the leg portion 32 of the resistor 1 in the X direction in the first embodiment. In other words, the lengths of the protruded portions 211 and 311 in the X direction are larger, in other words, longer than the lengths of the protruded portions 211 and 311 in the X direction in the first embodiment.

With such a configuration, the length of the resistance body 10 in the direction in which the current flows (the X direction) is reduced, and the cross-sectional area of a cross-section normal to the X direction is increased. By doing so, while maintaining the dimension of the resistor 1 as a whole, it is possible to ensure a distance between the circuit board and the mounting surface of the resistance body 10 as well as to achieve the resistor 1 with low resistance. In addition, because the lengths of the leg portions 22 and 32 and the lengths of the protruded portions 211 and 311 in the X direction can be designed arbitrarily, it is possible to improve a design flexibility of the circuit board on which the resistor 1 is to be mounted.

Similarly to the above description, when the length L of the resistor 1 in the longitudinal direction (the X direction) is set constant, a protruding length of the protruded portion 211 in the X direction (L1−L11) is longer than the length L0 of the resistance body 10 in the X direction, and in a similar manner, a protruding length of the protruded portion 311 in the X direction (L2−L21) is larger than, in other words, longer than the length L0 of the resistance body 10 in the X direction. With such a configuration, because the length of the resistance body 10 in the X direction is small, in other words, short, it is possible to greatly reduce the resistance value of the resistor 1.

Third Embodiment

Figure 4:
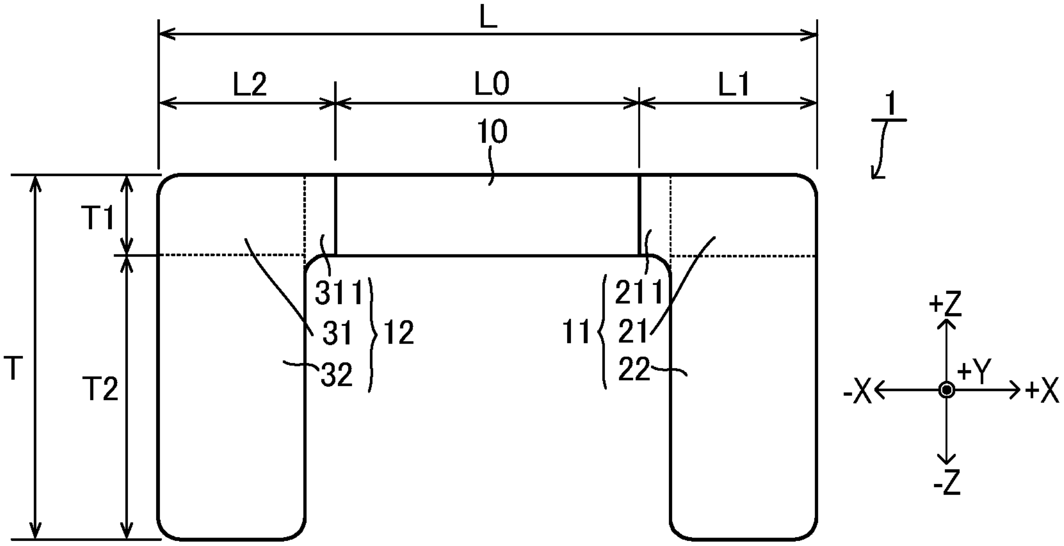
FIG. 4 is a side view of the resistor in a third embodiment.

FIG. 4 is a side view of the resistor 1 in a third embodiment. Similarly to the resistor 1 in the second embodiment, the resistor 1 in the third embodiment has different dimensional ratios for the resistance body 10, the first electrode body 11 (the main body portion 21 and the leg portion 22), and the second electrode body 12 (the main body portion 31 and the leg portion 32).

In the resistor 1 in the third embodiment, by referring to the length of the resistor 1 in the Z direction as T (for example, constant), the above-described ratio (T2/T1) is set so as to be larger than the corresponding ratio in the first embodiment. Especially, the ratio is set such that the lengths T2 of the leg portions 22 and 32 are longer than the lengths T1 of the protruded portions 211 and 311 in the length-wise direction (the Z direction) (such that the lengths of the protruded portions 211 and 311 in the Z direction (the width in the height direction) are shorter than the lengths of the leg portions 22 and 32 in the Z direction).

In addition, the ratio (L0/L1) and the ratio (L0/L2) are also respectively set so as to be higher than the corresponding ratios for the resistor 1 in the first embodiment.

By doing so, the length L0 of the resistance body 10 in the direction in which the current flows (the X direction) becomes longer than that of the resistance body 10 in the first embodiment, and the cross-sectional area of the cross-section normal to the X direction also becomes smaller than the corresponding cross-sectional area of the resistance body 10 in the first embodiment. Thus, it is possible to design the resistance value of the resistor 1 so as to be higher than that of the resistor 1 in the first embodiment. In addition, because the lengths T2 of the leg portions 22 and 32 are set so as to be larger than, in other words, higher than those in the first embodiment and the second embodiment, it is possible to reduce creeping of the solder to the resistance body 10 in a reflowing step. Furthermore, because a larger space can be formed by the resistance body 10, the leg portion 22, and the leg portion 32, it is possible to improve the design flexibility of the circuit board, thus enabling, for example, arrangement of wirings of the circuit board in this space, etc. Especially, by setting T2 so as to be larger than T1, an effect of suppressing the creeping of the solder and the design flexibility of the circuit are improved significantly.

Fourth Embodiment

Figure 5:
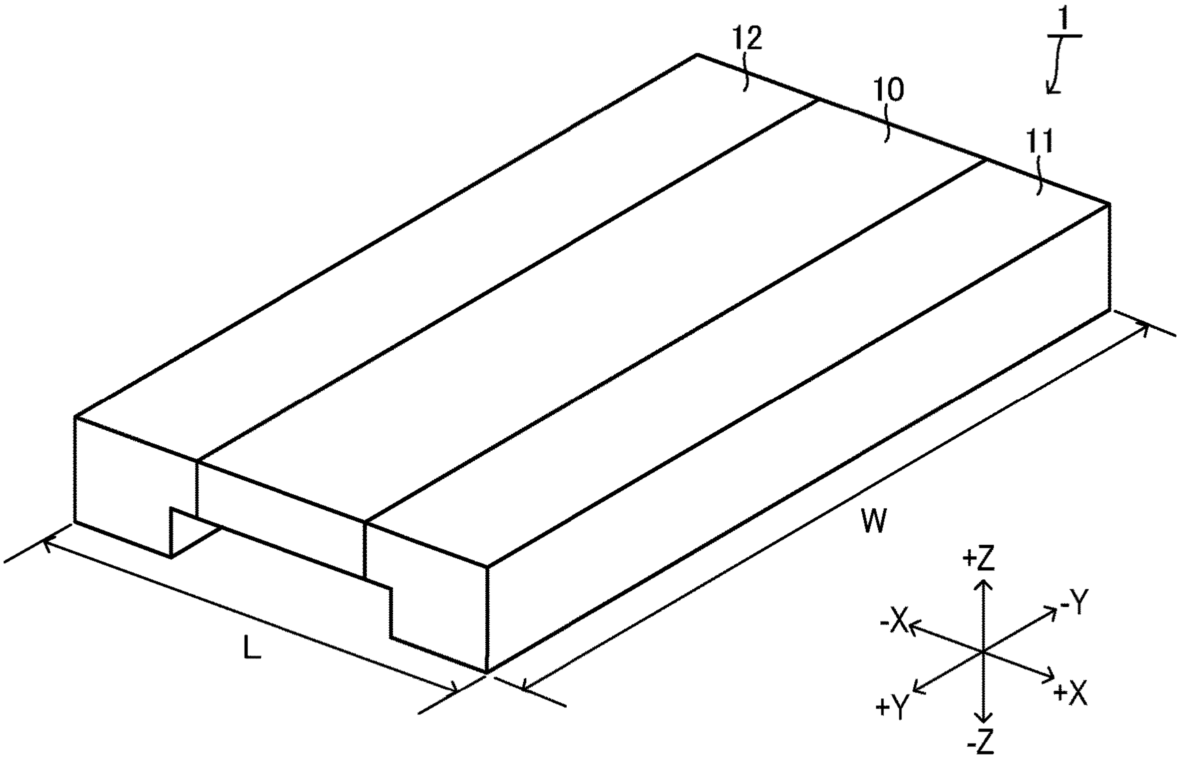
FIG. 5 is a perspective view of the resistor in a fourth embodiment.

FIG. 5 is a perspective view of the resistor 1 in a fourth embodiment. The resistor 1 in the fourth embodiment has the length in the Y direction that is longer than that of the resistor 1 in the first to third embodiments, and so, the length W in the Y direction can be set so as to be longer than the length L in the X direction. It is possible to arbitrarily set the above-described ratio (L0/L1), the ratio (L0/L2), and the ratio (T2/T1) in the fourth embodiment as in the first to third embodiments.

In the fourth embodiment, because the length in the Y direction is increased, the mounting surface area of the circuit board is also increased. However, because the length of the resistance body 10 in the Y direction is also increased, it is possible to reduce the resistance value of the resistor 1 by a corresponding amount. In addition, for example, because the length W can be set arbitrarily while keeping the ratio (L0/L1), the ratio (L0/L2), and the ratio (T2/T1) described above constant, it is possible to increase the variation of the product, and it is possible to arbitrarily design the product in accordance with the circuit board.

Fifth Embodiment and Sixth Embodiment

Figure 6:
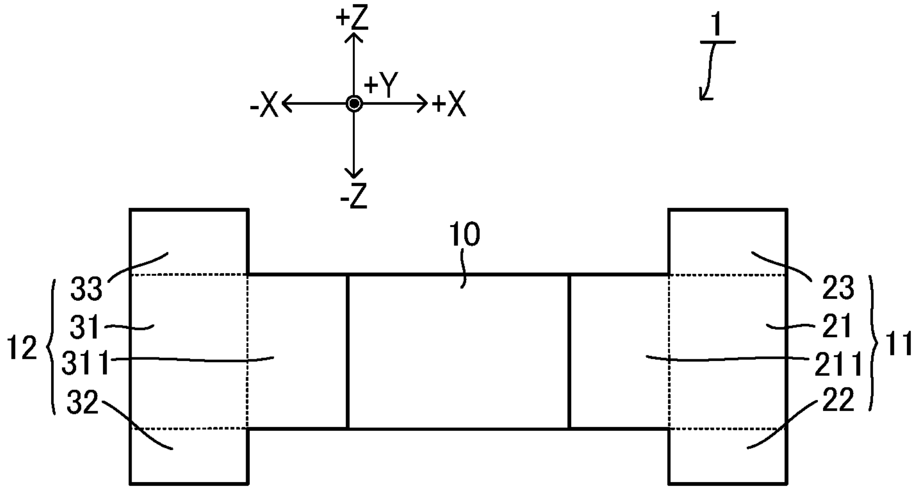
FIG. 6 is a side view of the resistor in a fifth embodiment.
Figure 7:
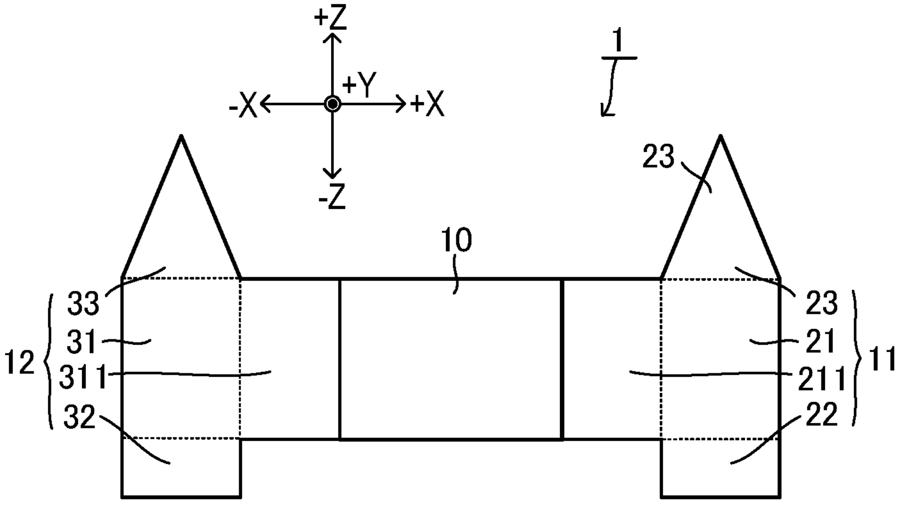
FIG. 7 is a side view of the resistor in a sixth embodiment.

FIG. 6 is a side view of the resistor 1 in a fifth embodiment. FIG. 7 is a side view of the resistor 1 in a sixth embodiment.

In the resistor 1 in the fifth embodiment and the sixth embodiment, it is assumed that the wire bonding is to be performed on the first electrode body 11 and the second electrode body 12. A projected portion 23 is formed on an upper surface of the main body portion 21 of the first electrode body 11 (the surface on the reverse side of the mounting surface, and the surface on +Z side), and a projected portion 33 is also formed on the main body portion 31 of the second electrode body 12.

As shown in FIG. 6, the projected portion 23 in the fifth embodiment is a member that extends in the Y direction. An end portion of the projected portion 23 on the +X direction side forms the same flat surface with the main body portion 21 and forms a step with an upper surface of the main body portion 21. The projected portion 33 is a member that extends in the Y direction. An end portion of the projected portion 33 on the −X direction side forms the same flat surface with the main body portion 31 and forms a step with an upper surface of the main body portion 31.

It suffices that the length of the projected portion 23 in the X direction is shorter than the length of the main body portion 21 in the X direction, and it may be the same or different from the length of the leg portion 22 in the X direction. Similarly, it suffices that the length of the projected portion 23 in the X direction is shorter than the length of the main body portion 31 in the X direction, and it may be the same or different from the length of the leg portion 32 in the X direction.

In addition, the length of the projected portion 23 in the Z direction may be the same or different from the length of the leg portion 22, and similarly, the length of the projected portion 23 in the Z direction may be the same or different from the length of the leg portion 32. Furthermore, for the projected portion 23 and the projected portion 33, the length in the X direction and the length in the Z direction may be the same or different from each other.

In the fifth embodiment, the positions where the wire bonding can be performed are limited to the upper surfaces of the projected portions 23 and 33 or the portions of the upper surfaces of the main body portions 21 and 31 where the projected portions 23 and 33 are not formed. With such a configuration, it is possible to reduce variations between products by limiting the attachment positions for the wire bonding. In addition, because the projected portions (the projected portions 23 and 33 and the leg portions 22 and 32) are formed on the upper and lower surfaces, there is no distinction between the front surface and the back surface for the resistor 1, and the resistor 1 can be mounted in both orientations.

As shown in FIG. 7, although the projected portions 23 and 33 in the sixth embodiment have the arrangement similar with those of the projected portions 23 and 33 in fifth embodiment shown in FIG. 6, the projected portions 23 and 33 has a triangle shape when viewed from the Y direction, and the apex of this triangle forms a ridge line extending in the Y direction. The corner on the base of the triangle formed by the projected portion 23, which is the corner on the +X direction side, matches with an upper end portion of the main body portion 21 on the +X direction side. The corner on the base of the triangle formed by the projected portion 33, which is the corner on the −X direction side, matches with an upper end portion of the main body portion 31 on the −X direction side.

Therefore, in the sixth embodiment, the wire bonding to the projected portions 23 and 33 is prohibited. Thus, it is possible to reduce the variations between products by further limiting the attachment positions for the wire bonding compared with the case in the fifth embodiment.

Seventh Embodiment

Figure 8:
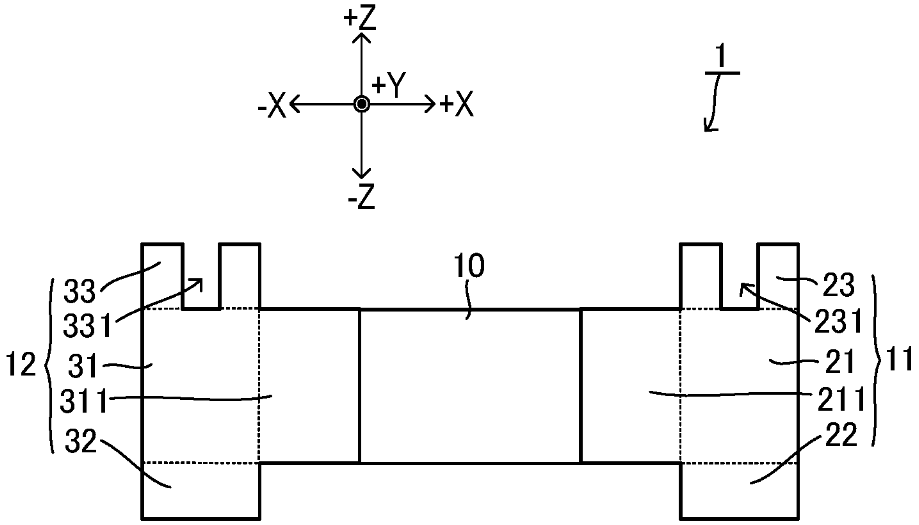
FIG. 8 is a side view of the resistor in a seventh embodiment.

FIG. 8 is a side view of the resistor 1 in a seventh embodiment. Although the resistor 1 in the seventh embodiment and the resistor 1 in the fifth embodiment have the common configuration, a slit 231 is formed in the projected portion 23, and a slit 331 is formed in the projected portion 33.

The slit 231 has a predetermined depth from the upper end of the projected portion 23 in the −Z direction and has a groove shape that penetrates through the projected portion 23 in the Y direction. The slit 331 has a predetermined depth from the upper end of the projected portion 33 in the −Z direction and has the groove shape that penetrates through the projected portion 33 in the Y direction. The width and the depth of the slit 231 can be set arbitrarily.

As described above, in the seventh embodiment, by forming the slits 231 and 331, the surface areas of the projected portions 23 and 33 are increased to enable them to exhibit a function as a heat sink. In addition, because a heat radiating plate can be sandwiched between the slits 231 and 331, for example, it is possible to further increase the heat radiation capacity in this case.

Eighth Embodiment

Figure 9:
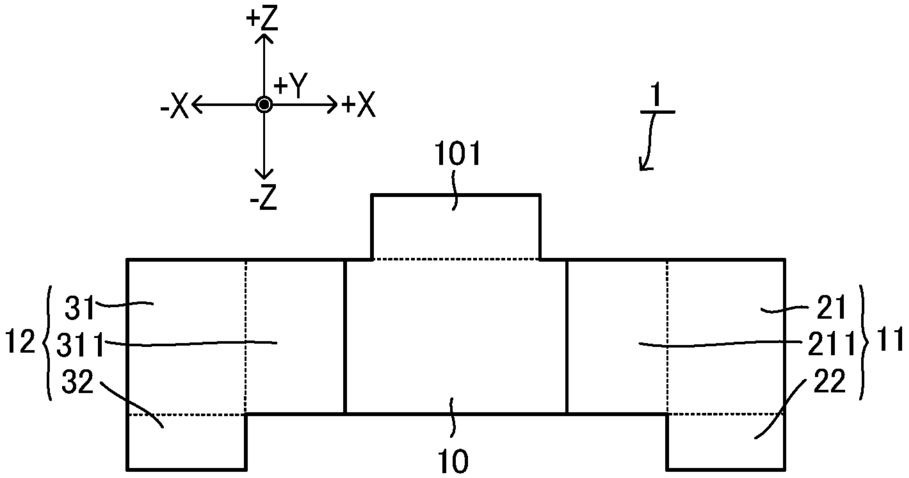
FIG. 9 is a side view of the resistor in an eighth embodiment.

FIG. 9 is a side view of the resistor 1 in an eighth embodiment. The resistor 1 in the eighth embodiment is configured by forming a projected portion 101 on a top of the resistance body 10 in the resistor 1 in the first embodiment. The projected portion 101 can also be applied to the resistor 1 in other embodiments.

Although the length of the projected portion 101 in the X direction is shorter than the length of the resistance body 10 in the X direction, they may have the same width.

Although the resistance body 10 is the portion where the heat is generated the most in the resistor 1, by forming the projected portion 101 on this portion, it is possible to improve the heat radiation property. In addition, by forming a plurality of slits in the projected portion 101 as shown in FIG. 8, it is possible to further increase the heat radiation property. In addition, a step is formed on the upper surface of the resistor by forming the projected portion 101, and so, it is possible to visualize that the lower part of the step as the position where the wire bonding can be performed and that the upper part of the step as the position where the wire bonding cannot be performed. Therefore, it is possible to avoid attachment error for the attachment position of the wire bonding.

Ninth Embodiment and Tenth Embodiment

Figure 10:
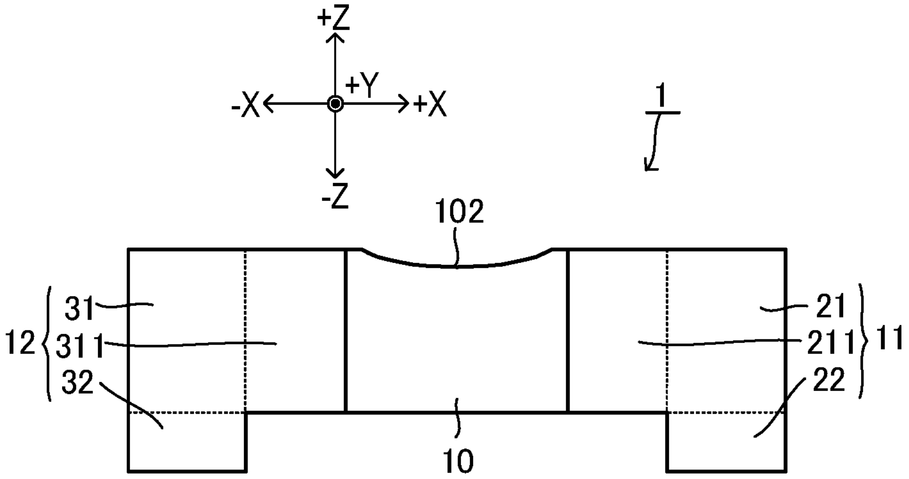
FIG. 10 is a side view of the resistor in a ninth embodiment.
Figure 11:
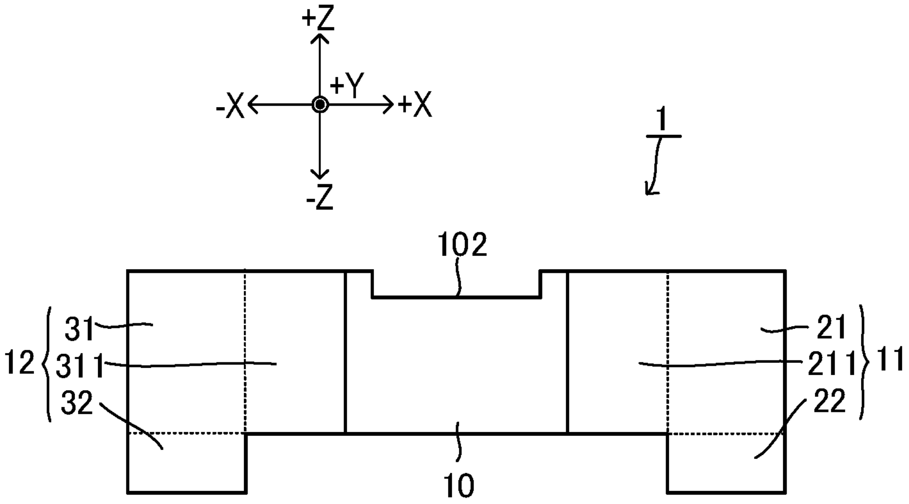
FIG. 11 is a side view of the resistor in a tenth embodiment.

FIG. 10 is a side view of the resistor 1 in a ninth embodiment. FIG. 11 a side view of the resistor 1 in a tenth embodiment. The resistor 1 in the ninth embodiment and the resistor 1 in the tenth embodiment are each configured by forming depressed portions 102 and 103 on the top of the resistance body 10 in the resistor 1 in the first embodiment (may includes the resistor 1 in other embodiments), for example.

As shown in FIG. 10, the depressed portions 102 in the ninth embodiment has an arc shape convexed downwards when viewed from the Y direction and has a cylindrical curved surface extending in the Y direction.

As shown in FIG. 11, the depressed portions 103 in the tenth embodiment has a rectangular shape when viewed from the Y direction and has a shape that extends in the Y direction.

As shown in the ninth embodiment and the tenth embodiment, by forming the depressed portions 102 and 103, the depressed portions 102 and 103 each forms a bottleneck for the current path in the direction in which the current flows (the X direction) in the resistance body 10. As described above, by making the cross-sectional area of the bottleneck portion normal to the X direction smaller, it is possible to set the resistance value of the resistor 1 at a higher value. In addition, although the adjustment of the resistance value can be performed by trimming the resistance body 10 by using laser, etc., by forming the depressed portions 102 and 103 in advance, it is possible to reduce a burden for a trimming processing. Furthermore, as described in the ninth embodiment, by forming the depressed portions 102 to have a curved surface, it is possible to reduce the electromigration in the resistance body 10.

Eleventh Embodiment

Figure 12:
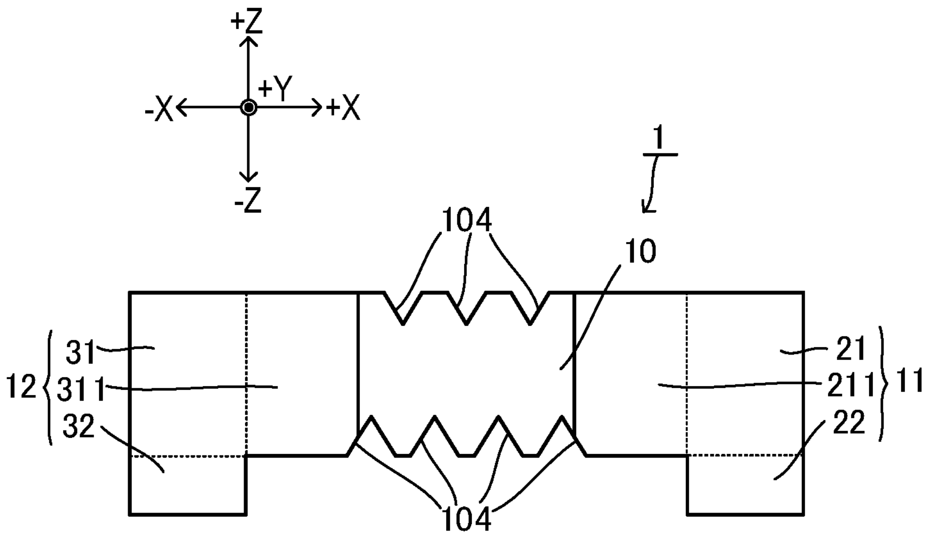
FIG. 12 is a side view of the resistor in an eleventh embodiment.

FIG. 12 is a side view of the resistor 1 in an eleventh embodiment. The resistor 1 in the eleventh embodiment has a configuration in which the resistance body 10 has a wave shape as a whole in the resistor 1 in the first embodiment. The wave shape can also be applied to the resistor 1 in other embodiments. In addition, the wave shape may be formed not only on the resistance body 10, but also on a part of the first electrode body 11 and/or a part of the second electrode body 12.

The wave shape is formed on the mounting surface and the upper surface (an opposite surface) of the resistance body 10 by providing a plurality of triangular grooves 104.

The triangular grooves 104 are grooves that are cut into the Z direction so as to form V-shapes in the mounting surface and the upper surface of the resistance body 10 and that extend in the Y direction, and the plurality of triangular grooves 104 are formed so as to be arranged side by side at substantially equal intervals in the X direction.

The triangular grooves 104 formed in the mounting surface of the resistance body 10 and the triangular grooves 104 formed in the upper surface of the resistance body 10 are arranged in a manner that the triangular grooves 104 are shifted from each other by about a half width of the width in the X direction. With such a configuration, a wave shape that oscillates in the Z direction is formed in the resistance body 10.

In the eleventh embodiment, by forming such a wave shape in a the resistance body 10, it is possible to improve a heat radiating property of the resistance body 10.

Explanation of Manufacturing Method of Resistor

Figure 13:
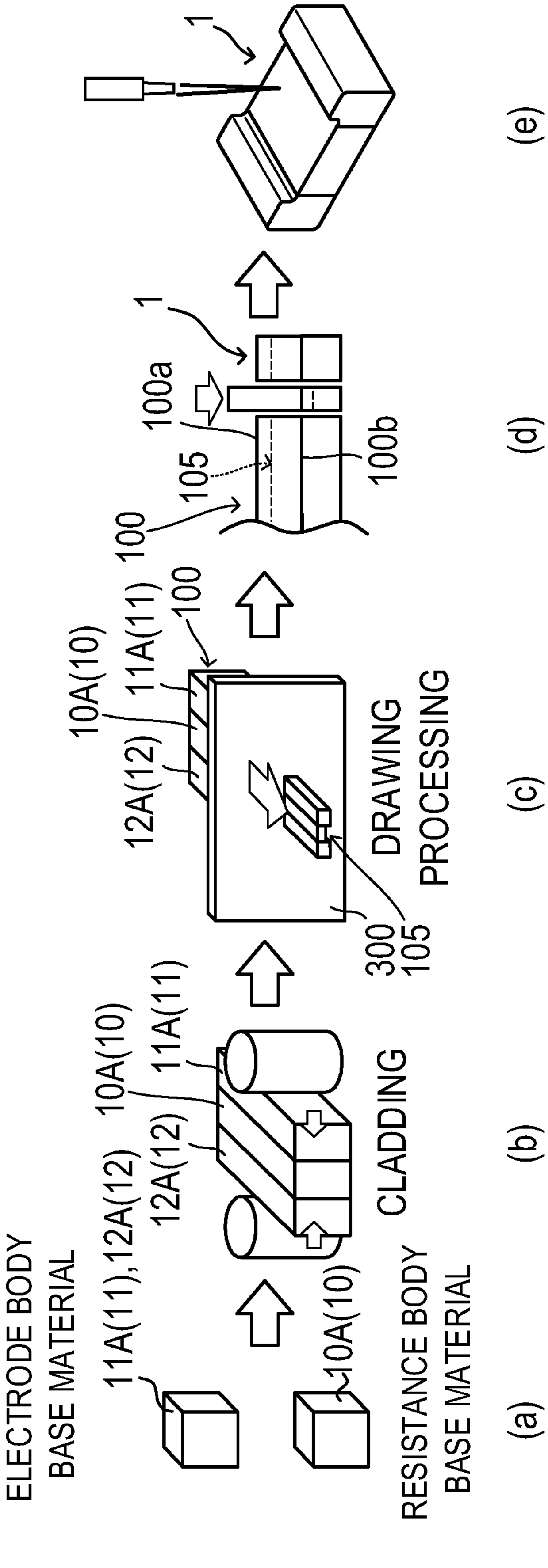
FIG. 13 is a schematic view for explaining a manufacturing method of the resistor of the present embodiment.

FIG. 13 is a schematic view for explaining the manufacturing method of the resistor 1 of the present embodiment. The manufacturing method described in this section can also be applied to any of the first to the eleventh embodiments.

The manufacturing method of the resistor 1 of the present embodiment includes: Step (a) of preparing materials; Step (b) of bonding the materials; Step (c) of processing the shape; Step (d) of cutting out individual resistors 1 (separation into pieces); and Step (e) of adjusting the resistance value of the resistor 1 by using a laser.

In Step (a) of preparing the materials, a resistance body base material 10A serving as a base material of the resistance body 10, an electrode body base material 11A serving as the base material of the first electrode body 11, and an electrode body base material 12A serving as the base material of the second electrode body 12 are prepared. The resistance body base material 10A and the electrode body base materials 11A and 12A are each a long wire rod having a flat rectangular shape. In the present embodiment, from the view point of the size, the resistance value, and a processability of the resistor 1, it is preferable to use the copper-manganese-tin alloy or the copper-manganese-nickel alloy as the material of the resistance body base material 10A (the resistance body 10) and to use the oxygen-free copper (C1020) as the material of the electrode body base materials 11A and 12A (the first electrode body 11 and the second electrode body 12).

In Step (b) of bonding the materials, the electrode body base material 11A, the resistance body base material 10A, and the electrode body base material 12A are stacked in this order, and the materials are bonded by applying pressure in the stacked direction, and thereby, the resistor base material 100 is formed.

In other words, in Step (b), a so-called cladding (the solid phase bonding) between dissimilar metal materials is performed. The bonded surface between the electrode body base material 11A and the resistance body base material 10A subjected to the cladding, and the bonded surface between the electrode body base material 12A and the resistance body base material 10A subjected to the cladding are each the diffusion bonded surface in which metal atoms from both materials are diffused to each other.

Thus, it is possible to perform firm mutual bonding at the bonded surface between the resistance body base material 10A and the electrode body base material 11A and at the bonded surface between the resistance body base material 10A and the electrode body base material 12A, without performing a common electron beam welding. In addition, a good electrical property is obtained at the bonded surface between the resistance body base material 10A (the resistance body 10) and the electrode body base material 11A (the first electrode body 11) and at the bonded surface between the resistance body base material 10A (the resistance body 10) and the electrode body base material 12A (the second electrode body 12).

Figure 14:
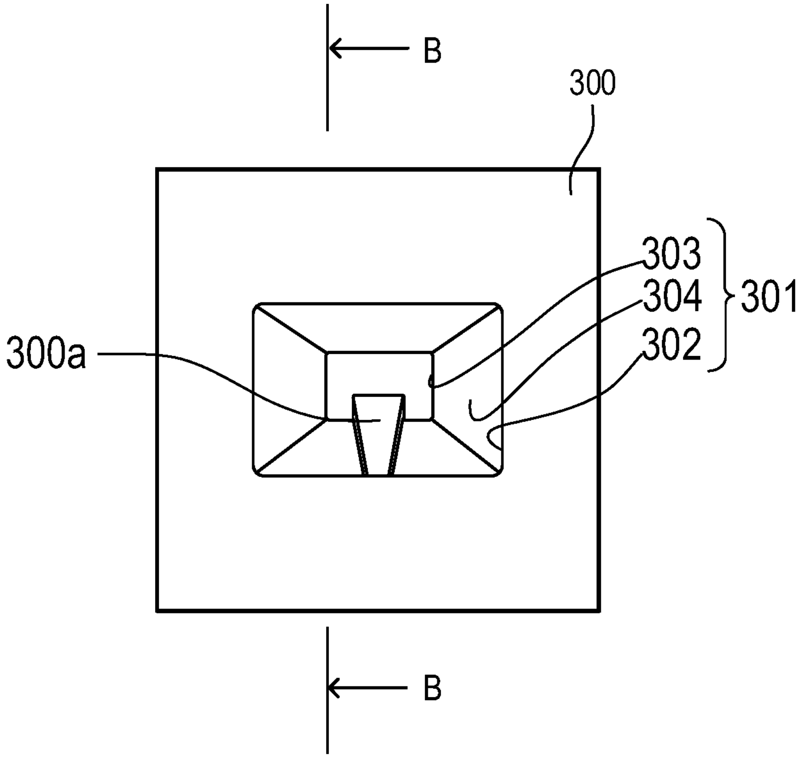
FIG. 14 is a front view of a die used in Step (c) shown in FIG. 13 viewed from the upstream side in the drawing direction F.
Figure 15:
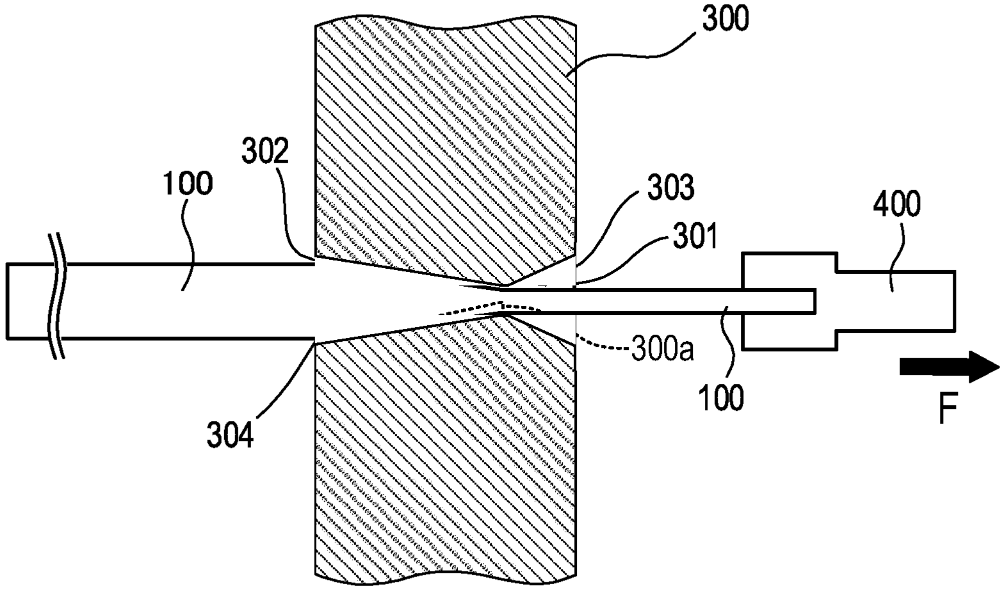
FIG. 15 is a sectional view taken along line B-B in FIG. 14, and is a schematic view for explaining a step of processing a shape of the resistor of the present embodiment in a manufacturing method.

FIG. 14 is a front view of a die 300 used in Step (c) shown in FIG. 13 viewed from the upstream side in the drawing direction F. FIG. 15 is a sectional view taken along line B-B in FIG. 14 and is a schematic view for explaining the step of processing the shape in the manufacturing method of the resistor 1 of the present embodiment. In the present embodiment, the die 300 is used in Step (c). In Step (c), the resistor base material 100 obtained by the cladding is passed through the die 300. When the resistor 1 of the present embodiment is to be manufactured, as one example, it is possible to use the die 300 shown in FIG. 14.

An opening portion 301 is formed in the die 300. The opening portion 301 has an inlet opening 302 that is set to have the dimension that allows the insertion of the resistor base material 100, an outlet opening 303 that is set to have the dimension smaller than the outer dimension of the resistor base material 100, and an insertion portion 304 that is formed to have a tapered shape from the inlet opening 302 towards the outlet opening 303. In the present embodiment, the opening portion 301 is formed to have a rectangular shape in which corner portions are processed to have the chamfered shapes.

By passing the resistor base material 100 through the die 300 having such a shape, it is possible to compressively deform the resistor base material 100 from all directions. Thus, a cross-sectional shape of the resistor base material 100 is processed to the shape that imitates the outer shape of the die 300 (the outlet opening 303).

In addition, in the present embodiment, in Step (c), when the resistor base material 100 is passed through the die 300, a drawing method in which the resistor base material 100 is drawn out by a holding tool 400 is applied.

In Step (c), it may be possible to perform a drawing processing by preparing a plurality of dies 300 respectively having the opening portions 301 with different sizes and by passing the resistor base material 100 through the plurality of dies 300 in a consecutive manner.

In addition, in Step (c), by changing the shape of the opening portion 301 of the die 300, it is possible to manufacture the resistors 1 in the first to the eleventh embodiments.

When the resistor 1 is to be manufactured, as one example, the die 300, in which a protruded portion 300*a* having a rectangular shape protruded towards the center of the opening is formed on a part of one side of the opening portion 301 (the inlet opening 302, the outlet opening 303), is applied. Because of the protruded shape provided on the rectangular outlet opening 303, a rectangular groove 105 extending continuously in the drawing direction F is formed in the resistor base material 100.

As the resistor base material 100 is cut into separate pieces, the rectangular groove 105 forms a recessed portion that is surrounded by the resistance body 10, the main body portion 21 and the leg portion 22 of the first electrode body 11, and the main body portion 31 and the leg portion 32 of the second electrode body 12.

Returning to FIG. 13, in Step (d) following Step (c), the resistor 1 is cut out from the resistor base material 100 so as to achieve the length W in the Y direction as designed. In addition, in the present embodiment, in Step (d), it is preferred that the resistor base material 100 be cut from a surface 100*a* of the resistor base material 100, in which the rectangular groove 105 is formed, towards an opposite surface 100*b*. By doing so, a burr of the metal is formed to have a shape that extends upwards from the upper surface of the resistor 1, and the burr extending in the −Z direction (FIGS. 1 and 2) (the burr extending towards a mounting substrate) is not formed on the leg portions 22 and 32. By doing so, it is possible to surely perform mounting of the resistor 1 onto the circuit board.

By following the above-described steps, it is possible to obtain an individual piece of the resistor 1 from the resistor base material 100. Furthermore, in Step (e), the resistance value of the resistor 1 is set at a desired resistance value by performing the trimming of the resistance body 10 by irradiating laser. The corner portions P shown in FIGS. 1 and 2 are formed so as to imitate the shape of the opening portion 301 of the die 300, and the stripe-patterned grooves and ridges 15 are a stripe-patterned sliding mark formed so as to extend in the length-wise direction of the resistor base material 100 when the resistor base material 100 is slid in a state in which the resistor base material 100 is compressed against an inner wall of the die 300 (the outlet opening 303).

Effects of Manufacturing Method of Resistor 1 According to Present Embodiment Next, operational advantages of the present embodiment will be described.

According to the manufacturing method of the present embodiment, the pressure is applied after stacking the electrode body base material 11A, the resistance body base material 10A, and the electrode body base material 12A in parallel, and the cladding (the solid phase bonding) is performed, and thereby, the resistor base material 100 (the resistor 1) having an integrated structure (in other words, a parallel structure) is obtained. Thus, for example, without using the electron beam welding, etc., it is possible to increase the bonding strength between the resistance body base material 10A (the resistance body 10) and the electrode body base material 11A (the first electrode body 11) and the bonding strength between the resistance body base material 10A (the resistance body 10) and the electrode body base material 12A (the second electrode body 12).

In addition, according to the manufacturing method of the present embodiment, by compressing the resistor base material 100 from all directions by passing it through the die 300, it is possible to form the external shape of the resistor base material 100. Therefore, after the resistor base material 100 is formed, it is possible to manufacture the individual resistor 1 only by performing Step (d). Therefore, it is possible to suppress individual differences caused by the manufacture of the resistor 1. In addition, by passing the resistor base material 100 through the die 300, it is possible to further increase the bonding strength between the resistance body 10 and the first electrode body 11 and the bonding strength between the resistance body 10 and the second electrode body 12.

As a method to compress the resistor base material 100 from all directions, if the resistor base material 100 is of a square shape, for example, there has been a method in which the resistor base material 100 is subjected to a first pressure welding by using a pair of rollers that apply the pressure in the thickness direction (Z), and thereafter, the resistor base material 100 is subjected to a second pressure welding by using a pair of rollers that apply the pressure in the width direction (Y).

However, with such a method, in the first pressure welding step, although the resistor base material 100 is compressed in the thickness direction (Z), the resistor base material 100 is expanded in the width direction (Y). In addition, in the following second pressure welding step, although the resistor base material 100 is compressed in the width direction (Y), the resistor base material 100 is expanded in the thickness direction (Z). As a result, the dimensional accuracy is deteriorated, and individual variation for the resistor, variation in a temperature distribution when power is applied to the resistor, and so forth are increased.

In contrast, according to the manufacturing method in the present embodiment, by performing the drawing step in which the resistor base material 100 is passed through the die 300, it is possible to uniformly compress the resistor base material 100 in the length-wise direction (X) and in the thickness direction (Z).

Therefore, compared with a resistor base material obtained by repeating the compression from one direction and the compression from the other direction by using the rollers, it is considered that an electrically advantageous bonding interface is formed in the resistor base material 100. Therefore, it is possible to suppress differences in properties for the resistor 1 as an end product.

With the manufacturing method according to the present embodiment, especially, by using the plurality of dies 300 respectively having the opening portions 301 of different types in a consecutive manner, a compression forming is performed such that the size of the resistor base material 100 is reduced in a consecutive manner. By doing so, it is possible to uniformly compress the resistor base material 100 in the length-wise direction X and the thickness direction Z while reducing a load to the resistor base material 100 and the die 300. Thus, it is possible to suppress the variations in properties for the resistor 1 as the end product.

In addition, with the manufacturing method according to the present embodiment, in Step (c) in which the resistor base material 100 is passed through the die 300, by applying the drawing step, it is possible to increase the accuracy of the end product compared with an extruding method. By using this manufacturing method, it is possible to achieve a stabilization of the properties as the resistor 1.

Especially, at least the outlet opening 303 of the opening portion 301 of the die 300 is formed with continuous curves. With such a configuration, it is possible to relieve a stress imparted while the resistor base material 100 is being passed through the opening, and so, it is possible to reduce the load to the resistor base material 100 and the die 300. Thus, it is possible to suppress the variations in properties for the resistor 1 as the end product.

In addition, because at least the outlet opening 303 is formed with the continuous curves, the corner portions P (the edge sides) of the resistor 1, which are obtained by being passed through the die 300, are chamfered. Thus, it is possible to suppress the electromigration caused in the resistor 1 at the corner portions P. In addition, it is possible to increase the heat cycle resistance of the resistor 1.

In addition, according to the manufacturing method of the present embodiment, because the first electrode body 11, the resistance body 10, and the second electrode body 12 are mutually bonded by the diffusion bonding (the solid phase bonding), the welding beads caused by the welding, such as the electron beam welding, etc., are not formed. When the bonding is performed by the welding, such as the common electron beam welding, etc., there may have been a risk in that, as the size of the resistor is reduced, the non-negligible influence is imparted to the resistance value property by the welding bead. However, there is no such a concern for the resistor 1 obtained by the manufacturing method according to the present embodiment.

As described above, in the manufacturing method according to the present embodiment, the resistor base material 100 is obtained by cladding (solid phase bonding) the resistance body base material 10A and the electrode body base materials 11A and 12A, and the resistor base material 100 is passed through the die 300 to perform the forming. Thus, because the bonding strength between the materials can be increased without employing the electron beam welding for example, and at the same time, because the high dimensional accuracy can be ensured, the manufacturing method is suitable for the manufacture of the small resistor 1.

When the resistor 1 is to be manufactured, in Step (d), it is preferred that the resistor base material 100 be cut by a scrap, etc. from the surface 100*a* of the resistor base material 100, in which the rectangular groove 105 is formed, towards the opposite surface 100*b*. By doing so, it is possible to prevent the burr formed during the cutting from being formed at the bottom surfaces of the electrodes that are on the mounting surface side. Furthermore, it is possible to form a corner portion R having the chamfered shape, which is different from the corner portions P described above, on the mounting surface side of the first electrode body 11 and the second electrode body 12 by the scrap, etc.

In addition, in the manufacturing method according to the present embodiment, before performing Step (c) of processing the shape, a step of adjusting the size of the resistor base material 100, which has been subjected to the cladding, to the size that allows the insertion into the die 300 may be performed.

Although the embodiments of the present disclosure have been described in the above, the above-mentioned embodiments merely illustrate a part of application examples of the present disclosure, and the technical scope of the present disclosure is not intended to be limited to the specific configurations in the above-mentioned embodiments. For example, in the present embodiment, although a description has been given of the resistor 1 that is obtained by passing the resistor base material 100 through the die 300 and by separating it into individual pieces, the present disclosure may also be applied to the resistor that is obtained by cladding the resistance body and the electrode bodies without passing them through the die 300 or to the resistor that is formed by press working.

The invention claimed is:

1. A resistor comprising a resistance body and a pair of electrodes connected to the resistance body, wherein end surfaces of the resistance body are respectively abutted to and bonded to end surfaces of the electrodes, the electrodes each includes a main body portion and a leg portion, the leg portion protruding from the main body portion in a mounting surface of the resistor, the main body portion and the leg portion are formed integrally with each other, where T2 denotes a length of the leg portion and T1 denotes a length of the resistance body in a thickness direction, T2 is smaller than T1, and a length dimension of the resistor is equal to or shorter than 3.2 mm.

2. The resistor according to claim 1, wherein in the mounting surface of the resistor, a boundary portion between the resistance body and the main body portion is flat.

3. The resistor according to claim 1, wherein the resistance body and the main body portion are bonded by solid phase bonding.

4. The resistor according to claim 1, wherein the main body portion has a protruded portion protruded towards the resistance body side.

5. The resistor according to claim 4, wherein a protruded length of the protruded portion is longer than a length of the resistance body.

6. The resistor according to claim 1, wherein an edge side of the leg portion on a side of the mounting surface in a direction in which the resistance body and the electrodes of the resistor are arranged has a chamfered shape.

7. The resistor according to claim 1, wherein a direction orthogonal to the direction in which the resistance body and the electrodes of the resistor are arranged as well as to a mounting direction of the resistor is set as a width direction, and a surface of the resistance body is formed with a stripe-patterned grooved and ridged surface, the stripe pattern extending in the width direction.

* * * * *